United States Patent [19]

Goldstein

[11] Patent Number: 5,124,384
[45] Date of Patent: Jun. 23, 1992

[54] TRANSPARENT CAULKS CONTAINING FUMED SILICA

[75] Inventor: Joel E. Goldstein, Allentown, Pa.

[73] Assignee: Air Products and Chemicals, Inc., Allentown, Pa.

[21] Appl. No.: 614,401

[22] Filed: Nov. 16, 1990

[51] Int. Cl.$^5$ ............................ C08K 5/12; C08K 5/43
[52] U.S. Cl. .................................... 524/169; 524/114; 524/188; 524/262; 524/296; 524/492; 524/560; 524/555; 524/562; 524/575.5; 524/925; 524/926
[58] Field of Search ............... 524/169, 492, 296, 555, 524/316, 493, 560, 562, 925, 926, 571, 575.5, 188, 262, 114

[56] References Cited

U.S. PATENT DOCUMENTS 4,340,524 7/1982 Bullman ............................ 524/297
4,626,567 12/1986 Chang ................................ 524/493

Primary Examiner—Veronica P. Hoke
Attorney, Agent, or Firm—Michael Leach; James C. Simmons; William F. Marsh

[57] ABSTRACT

In a sealant composition comprising a polymer latex, filler, plasticizer, silane adhesion promoter, and fumed silica, the improvement which comprises as the plasticizer a $C_1$–$C_8$ alkyl aryl phthalate, an N-($C_1$–$C_8$)alkyl arylsulfonamide, or mixtures thereof.

20 Claims, No Drawings

5,124,384

TRANSPARENT CAULKS CONTAINING FUMED SILICA

TECHNICAL FIELD

The present invention relates to polymer latex sealants useful as caulks and, more particularly, relates to polymer latex sealants containing fumed silica.

BACKGROUND OF THE INVENTION

Recently a new type of latex-based caulk has appeared on the market. When applied and allowed to dry, the caulk beads are transparent rather than white or pigmented. To be transparent, the caulk cannot contain any of the customary fillers. Therefore, to achieve the requisite viscosity of caulks, the latex is formulated with a thickener. Fumed silica is a common thickener as are cellulosics, polyacrylic acids and polyurethane inverse emulsions. Frequently, fumed silica is used in conjunction with one of the other thickeners as it provides excellent adhesion to glass and tile. However, the incorporation of fumed silica imparts a haze to the dried film so that the dried bead is no longer truly transparent but rather only translucent.

To date, this problem has been ignored by suppliers to the market. Either the suppliers call their product a translucent caulk or they mislead customers and call it transparent. Other manufacturers omit the fumed silica and sacrifice the adhesion, they target the lower end uses.

U.S. Pat. No. 4,626,567 discloses an acrylic copolymer latex sealant composition, which comprises an acrylic copolymer having a glass transition temperature not exceeding about 0° C., a hydrolyzed organoaminosilane, and anionic, nonionic or amphoteric surfactant, water and at least about 0.5% by weight silica, based on the total amount of the composition.

The sealant of the '567 patent may also include, if desired, plasticizers, freeze-thaw stabilizers, colorants or pigments, pigment dispersants, anti-bacterial and/or anti-fungal preservatives, and agents for improving rheological properties such as thickeners and anti-slump agents. The plasticizer would generally be used in an amount of up to about 25% by weight and the other additives when present, will total up to about 3% by weight, based on the total weight of the composition. A plasticizer may be desirable to reduce the tack of the copolymer so that the sealant can have the desired tack-free time of less than 72 hours. (Column 4, lines 1-14)

Example 1 of the '567 patent discloses an acrylic copolymer latex sealant containing fumed silica and mineral oil as a plasticizer. (Mineral oil is typically added to sealant compositions as a tooling aid.) The acrylic copolymer latex (58% solids) is identified as containing 96% of a copolymer of ethyl acrylate and ethylhexyl acrylate, 2% acrylic acid and 2% N-methylolacrylamide and having a Tg of −27° C. There is no disclosure with regard to the ratio of the ethyl acrylate and ethylhexyl acrylate nor of the stabilizing system used to prepare the latex.

SUMMARY OF THE INVENTION

The present invention provides a polymer latex sealant that is useful as a caulk, contains fumed silica and is transparent, not merely translucent. The fumed silica-containing polymer latex sealant is rendered transparent by the incorporation of 2 to 10 wt % plasticizer which is a Cl-C8 alkyl aryl diester of phthalic acid or an N-($C_1$-$C_8$) alkyl arylsulfonamide.

DETAILED DESCRIPTION OF THE INVENTION

Polymer latex sealant compositions of 80,000–400,000 cps according to the invention would have the following composition:

| Composition | Broad (wt %) | Preferred (wt %) |
| --- | --- | --- |
| Polymer latex (solids basis) | 80–93 | 85–92 |
| Plasticizer | 2–10 | 4–7 |
| Silane adhesion promoter | 0.3–1.5 | 0.7–1.1 |
| Fumed silica | 0.2–5 | 0.4–3 |
| Surfactant | 0.2–1 | 0.5–0.8 |
| Thickener | 0–5 | 2.5–4 |

The polymer latex can be a totally acrylic polymer latex, a vinyl acetate-ethylene (VAE) copolymer latex or any of the polymer latexes typically used in the art for making sealant compositions, especially caulks. Suitable latexes include Flexbond ®662 emulsion which comprises a butyl acrylate-methyl methacrylate copolymer, Airflex ®562 emulsion which contains a VAE copolymer and Airflex 600 emulsion which comprises a VAE/acrylic copolymer. The Flexbond and Airflex emulsions are available from Air Products and Chemicals, Inc.

The plasticizer used to render the sealant composition transparent must be a diester of phthalic acid or an N-alkyl arylsulfonamide, or mixtures of the two. Suitable diesters of phthalic acid include $C_1$–$C_8$ alkyl arylphthalates such as butyl benzylphthalate, ethyl benzylphthalate, hexyl phenylphthalate, and ethylhexyl phenylphthalate. Suitable N-alkyl arylsulfonamides include N-($C_1$–$C_8$)alkyl arylsulfonamides such as N-n-butyl benzenesulfonamide, N-n-butyl toluenesulfonamide, N-ethyl benzenesulfonamide, and N-iso-butyl benzylsulfonamide.

The silane adhesion promoter can be any of those well-known in the art including gamma-mercaptopropyltrimethoxysilane, gamma-glycidoxypropyltrimethoxysilane, gamma-aminopropyltriethoxysilane and mixtures thereof.

Suitable silanes also include the organo-amino silanes disclosed in U.S. Pat. No. 4,340,524.

The silica used in this invention may be a hydrophilic fumed silica or it may be a hydrophobic fumed silica derivative in which some of the hydroxyl groups on the surface of the fumed silica have been replaced by trimethylsiloxyl groups. Such hydrophobic silicas are known as silica silylates and are commercially available. It is presently preferred to use a hydrophilic silica.

Suitable thickeners which may be used include poly-(oxy-1,2-ethanediyl)-alpha-hydro-omega-hydroxy polymer with oxy-1,2-ethanediyl-alpha-hydro-omega-hydroxy-nonyl-phenoxyglycidyl ether oligomers and 5-isocyanato-1-(iso-cyanatomethyl)-1,3, 3-trimethylcyclohexane or hydroxyethyl cellulose or polyacrylic acid polymers and copolymers or a base such as sodium hydroxide o to raise the pH if sufficient carboxylate is present in the system.

An ionic, nonionic or amphoteric surfactant is also present, preferably a nonionic surfactant, to stabilize the latex and to improve the mechanical stability of the composition. Suitable surfactants include the alkylphenoxy poly(ethyleneoxy) ethanols, dioctyl sodiumsulfosuccinate and polyacrylic acid salts.

Filers may be optionally employed in the present invention, such as any conventional inorganic filler, e.g. carbonates, oxides and sulphates. Suitable fillers include calcium carbonate, calcium oxide, magnesium carbonate, barium sulfate and the like. When present, the filler may be about 10 to about 30 wt %, based on total weight of the composition.

The sealant composition may also include if desired a freeze-thaw stabilizer, a biocide, fillers and a tooling aide well known in the art.

The sealant composition may be readily prepared using a conventional mixer, followed by deairing. Mixing and deairing procedures are well known in the art.

In the following Examples 1-10 various plasticizers were evaluated in sealant compositions. A determination of transparency versus translucency was made by comparing ⅛ inch specimens of the sealant compositions which have been dried according to ASTM C-794.

EXAMPLE 1

To 1500g of Flexbond 662 DEV emulsion was added enough 10% aqueous sodium hydroxide to raise the pH to 7.0. While stirring in a Hobart mixer, 6.0g Triton X-405 surfactant, 0.15g Kathon LX biocide, 16.0g 25 Additive silane adhesion promoter, 100.0g N-n-butyl benzenesulfonamide, 12.5g mineral oil, 20.0g ethylene glycol and 30.0g UCAR SCT-270 thickener were added. After stirring for 15 minutes, the mixture was transferred to a Ross double planetary vacuum mixer where 10.0g of Cabosil M-5 fumed silica was added. The mixture was stirred for 30 minutes under vacuum. The caulk was allowed to stand overnight.

EXAMPLE 2

The same as Example 1, except 100.00g of butyl benzylphthalate was used in place of the N-n-butyl benzenesulfonamide.

EXAMPLE 3

The same as Example 1, but the N-n-butyl benzenesulfonamide was not added.

EXAMPLE 4

The same as Example 1, except 100.00g of dipropylene glycol dibenzoate was used in place of the N-n-butyl benzenesulfonamide.

EXAMPLE 5

The same as Example 1, except 100.00g of tetraethylene glycol di-2-ethylhexoate was used in place of the N-n-butyl benzenesulfonamide.

EXAMPLE 6

To 1125.0g of Flexbond-662 DEV emulsion was added 375.00g Airflex-600BP emulsion and the pH adjusted to 7.0 with 10% sodium hydroxide. The blend was stirred in a Hobart mixer and 6.00g Triton X-405 surfactant, 20.0g ethylene glycol, 12.5g mineral oil, 0.15g Kathon LX biocide, 80.0g dibutoxyethyl adipate, 16.00g 25 Additive silane adhesion promoter, and 30.0g UCAR SCT-270 thickener were added. After stirring for 15 minutes, the mixture was transferred to a Ross double planetary vacuum mixer and 5.00g of Cabosil HS-5 fumed silica was added. The mixture was stirred for 30 minutes under vacuum. The caulk was allowed to stand overnight.

EXAMPLE 7

The same as Example 6, except 80.00g of diethylene glycol dibenzoate was used in place of the dibutoxyethyl adipate.

EXAMPLE 8

The same as Example 7, except 375.00g of Airflex-562BP emulsion was used in place of the Airflex-600BP emulsion and 10.00g of sodium meta-bisulfite was added to the mixture during stirring in the Hobart mixer.

EXAMPLE 9

The same as Example 8, except N-n-butyl benzenesulfonamide was added as the plasticizer.

EXAMPLE 10

The same as Example 8, except butyl benzylphthalate was added as the plasticizer.

Table 1 identifies the latex and plasticizer used in each caulking composition of Example 1-10 and whether their final appearance was transparent or translucent.

TABLE 1

| Example | Latex | Plasticizer | Appearance |
|---|---|---|---|
| 1 | Flexbond 662 DEV | N-n-butyl benzenesulfonamide | transparent |
| 2 | Flexbond 662 DEV | butyl benzylphthalate | transparent |
| 3 | Flexbond 662 DEV | None | translucent |
| 4 | Flexbond 662 DEV | dipropyleneglycol dibenzoate | translucent |
| 5 | Flexbond 662 DEV | tetraethyleneglycol di-2-ethylehexoate | translucent |
| 6 | Flexbond 662 DEV Airflex 600 BP | dibutoxyethyl adipate | translucent |
| 7 | Flexbond 662 DEV Airflex 600 BP | diethyleneglycol dibenzoate | translucent |
| 8 | Flexbond 662 DEV Airflex 562 BP | diethyleneglycol dibenzoate | translucent |
| 9 | Flexbond 662 DEV Airflex 562 BP | N-n-butyl benzenesulfonamide | transparent |
| 10 | Flexbond 662 DEV Airflex 562 BP | butyl benzylphthalate | transparent |

STATEMENT OF INDUSTRIAL APPLICATION

The present invention provides transparent caulking compositions.

I claim:

1. In a sealant composition comprising a polymer latex and fumed silica, the improvement which comprises 2 to 10 wt % of a plasticizer which is a $C_1$–$C_8$ alkyl aryl diester of phthalic acid, an N-($C_1$–$C_8$)alkyl arylsulfonamide or a mixture thereof.

2. The sealant composition of claim 1 in which the alkyl aryl ester of phthalic acid is butyl benzylphthalate, ethyl benzylphthalate, hexyl phenylphthalate, or ethylhexyl phenylphthalate.

3. The sealant composition of claim 1 in which the alkyl aryl ester of phthalic acid is butyl benzylphthalate.

4. The sealant composition of claim 1 in which the N-alkyl arylsulfonamide is N-n-butyl benzenesulfonamide, N-n-butyl toluenesulfonamide, N-ethyl benzenesulfonamide, or N-iso-butyl benzylsulfonamide.

5. The sealant composition of claim 1 in which the N-alkyl arylsulfonamide is N-n-butyl benzenesulfonamide.

6. In a sealant composition comprising a polymer latex, plasticizer, silane adhesion promoter, and fumed silica, the improvement which comprises as the plasticizer a $C_1$–$C_8$ alkyl arylphthalate, an N-($C_1$–$C_8$)alkyl arylsulfonamide, or mixtures thereof.

7. The sealant composition of claim 6 in which the plasticizer is a $C_1$–$C_8$ alkyl arylphthalate.

8. The sealant composition of claim 7 in which the plasticizer is butyl benzylphthalate.

9. The sealant composition of claim 6 in which the plasticizer is an N-($C_1$–$C_8$)alkyl arylsulfonamide.

10. The sealant composition of claim 9 in which the plasticizer is N-n-butyl benzenesulfonamide.

11. A caulking composition consisting essentially of the following ingredients on wt % basis:
   Polymer latex (solids basis): 80–93
   Plasticizer: 2–10
   Silane adhesion promoter: 0.3–1.5
   Fumed silica: 0.2–5
   Surfactant: 0.2–1
   Thickener: 0–5
wherein the plasticizer is a $C_1$–$C_8$ alkyl arylphthalate, an N-($C_1$–$C_8$) alkyl arylsulfonamide, or mixtures thereof.

12. The caulking composition of claim 11 in which the alkyl arylphthalate is butyl benzylphthalate, ethyl benzylphthalate, hexyl phenylphthalate, or ethylhexyl phenylphthalate.

13. The caulking composition of claim 11 in which the alkyl arylo phthalate is butyl benzylphthalate.

14. The caulking composition of claim 11 in which the N-alkyl arylsulfonamide is N-n-butyl benzenesulfonamide, N-n-butyl toluenesulfonamide, N-ethyl benzenesulfonamide, or N-iso-butyl benzylsulfonamide.

15. The caulking composition of claim 11 in which the N-alkyl arylsulfonamide is N-n-butyl benzenesulfonamide.

16. The caulking composition of claim 11 in which
   Polymer latex (solids basis): 85–92
   Plasticizer: 4–7
   Silane adhesion promote: 0.7–1.1
   Fumed silica: 0.4–3
   Surfactant 0.5–0.8
   Thickener: 2.5–4.

17. The caulking composition of claim 16 in which the plasticizer is a $C_1$–$C_8$ alkyl arylphthalate.

18. The caulking composition of claim 17 in which the alkyl arylphthalate is butyl benzylphthalate.

19. The caulking composition of claim 16 in which the plasticizer is an N-($C_1$–$C_8$) alkyl arylsulfonamide.

20. The caulking composition of claim 19 in which the N-alkyl arylsulfonamide is N-n-butyl benzenesulfonamide.

* * * * *